(12) United States Patent
Oriol et al.

(10) Patent No.: US 12,104,504 B2
(45) Date of Patent: Oct. 1, 2024

(54) DEVICE FOR SETTING THE PITCH OF BLADES FOR A TURBINE ENGINE, AND TURBINE ENGINE COMPRISING SAME

(71) Applicant: SAFRAN AIRCRAFT ENGINES, Paris (FR)

(72) Inventors: Sebastien Oriol, Moissy-Cramayel (FR); Caroline Marie Frantz, Moissy-Cramayel (FR); Bastien Pierre Verdier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/546,405

(22) PCT Filed: Mar. 7, 2022

(86) PCT No.: PCT/FR2022/050407
§ 371 (c)(1),
(2) Date: Aug. 14, 2023

(87) PCT Pub. No.: WO2022/189746
PCT Pub. Date: Sep. 15, 2022

(65) Prior Publication Data
US 2024/0011404 A1 Jan. 11, 2024

(30) Foreign Application Priority Data
Mar. 9, 2021 (FR) .................................. 2102303

(51) Int. Cl.
*F01D 7/00* (2006.01)
*B64D 27/10* (2006.01)
(Continued)

(52) U.S. Cl.
CPC ............... *F01D 7/00* (2013.01); *B64D 27/10* (2013.01); *F15B 1/04* (2013.01); *F15B 13/0402* (2013.01)

(58) Field of Classification Search
CPC ...... F01D 7/00; F04D 15/0055; F04D 29/323; F04D 29/287; B64D 27/10; F15B 1/04; F15B 13/0402; B64C 11/385
See application file for complete search history.

(56) References Cited

U.S. PATENT DOCUMENTS 4,348,155 A * 9/1982 Barnes .................. F03D 7/0224
416/158
2003/0077173 A1   4/2003 Franchet et al.
(Continued)

FOREIGN PATENT DOCUMENTS

| EP | 1306558 A1 | 5/2003 |
|----|------------|--------|
| EP | 2479429 A2 | 7/2012 |

(Continued)

OTHER PUBLICATIONS

International Search Report received for PCT Patent Application No. PCT/FR2022/050407, mailed on May 31, 2022, 5 pages (2 pages of English Translation and 3 pages of Original Document).

*Primary Examiner* — Aaron R Eastman
(74) *Attorney, Agent, or Firm* — WOMBLE BOND DICKINSON (US) LLP

(57) ABSTRACT

A device for setting the pitch of blades for a turbine engine, including a control system acting on a linkage mechanism and including an actuator having two chambers; —a supply member coupled to a fluid transfer bearing for transferring a pressurised fluid from a main supply source in a fixed frame of reference to the chambers; —an auxiliary supply circuit which is arranged in a rotating frame of reference and is connected to the supply member and to the main supply source, the supply member being configured to: —in normal
(Continued)

operation, allow fluid to pass from the main supply source to the chambers and to the auxiliary supply circuit, and—in the event of a break in the supply to the chambers from the main supply source, allow pressurised fluid to pass from the auxiliary supply circuit to the chambers.

13 Claims, 4 Drawing Sheets

(51) Int. Cl.
*F15B 1/04* (2006.01)
*F15B 13/04* (2006.01)

(56) References Cited

U.S. PATENT DOCUMENTS

| | | |
|---|---|---|
| 2012/0187681 A1 | 7/2012 | Andersen et al. |
| 2022/0003123 A1 | 1/2022 | Tajan et al. |

FOREIGN PATENT DOCUMENTS

| | | |
|---|---|---|
| GB | 2071781 A | 9/1981 |
| WO | 2020/074816 A1 | 4/2020 |

\* cited by examiner

[Fig.1]
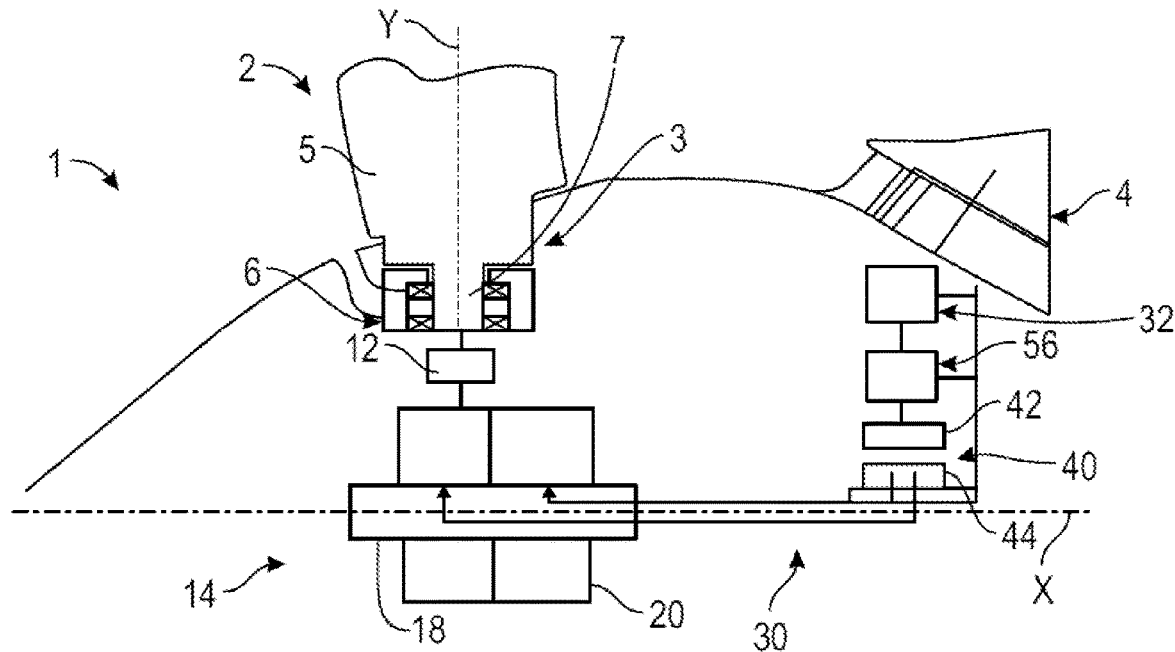
[Fig.2]
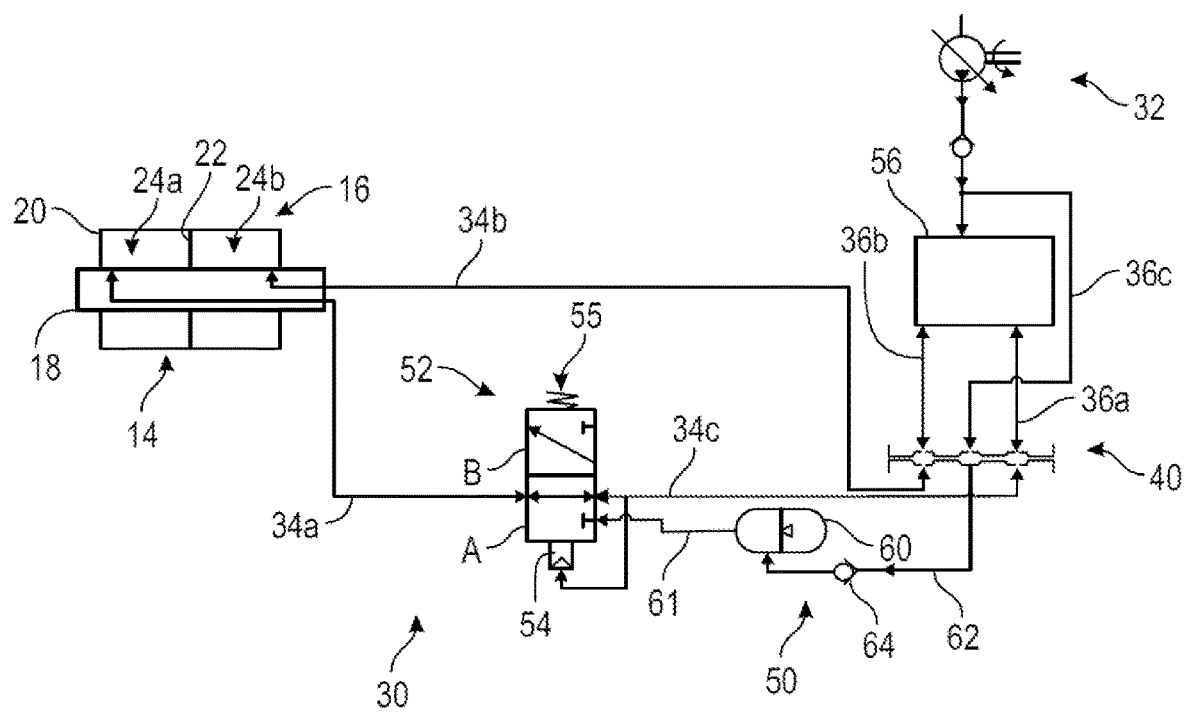

[Fig.3]
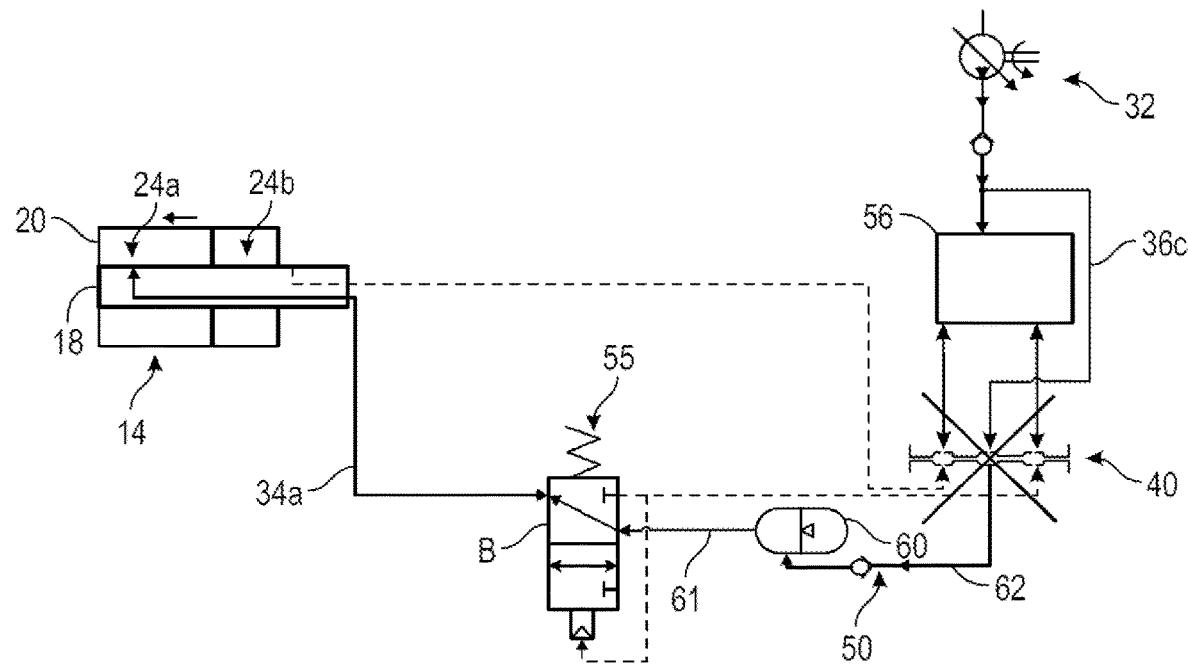
[Fig.4]
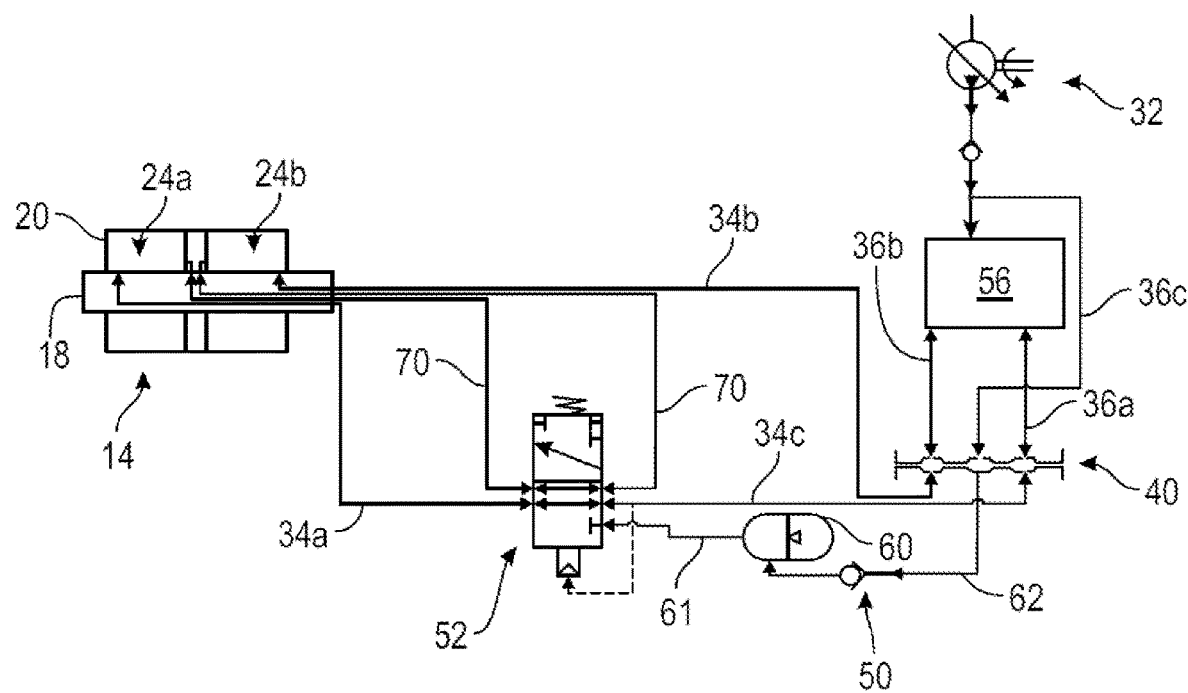

[Fig.5]
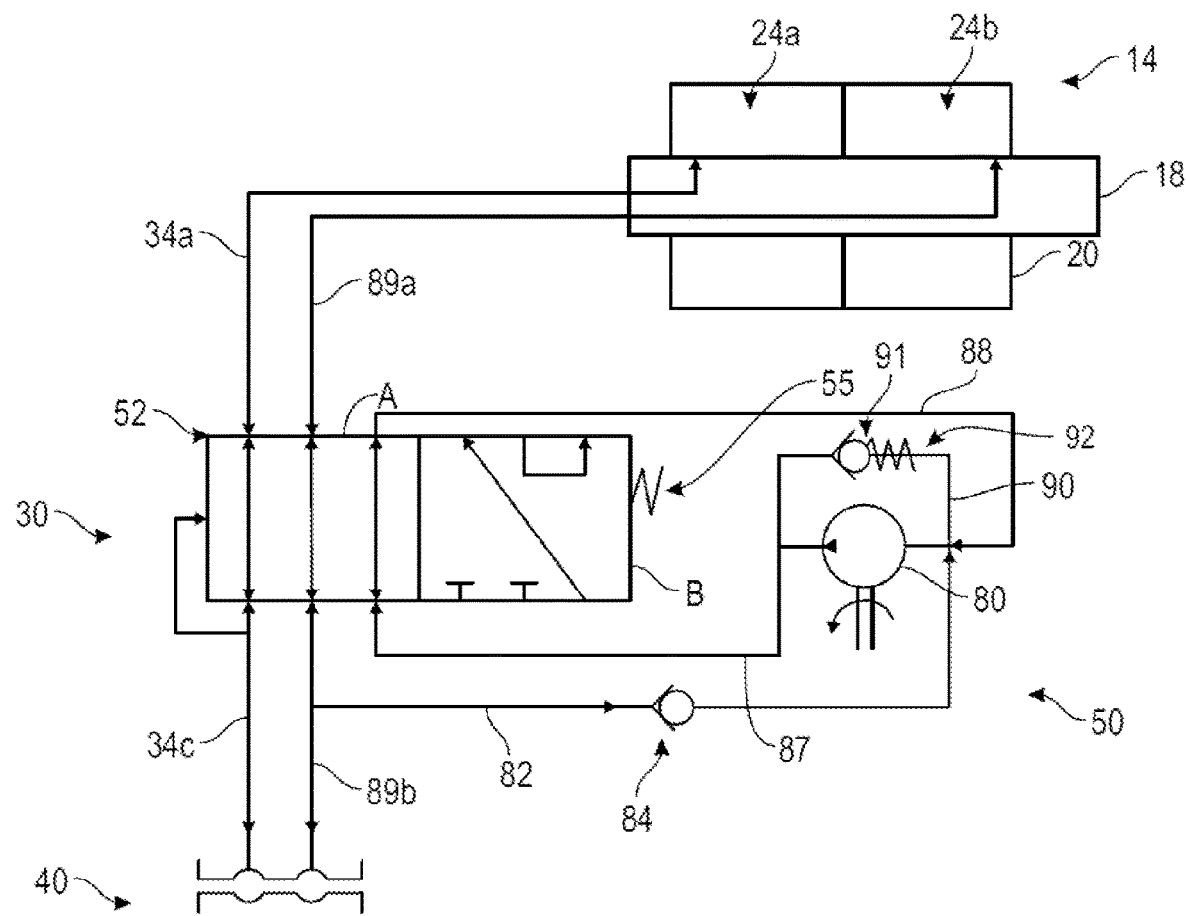

[Fig.6]
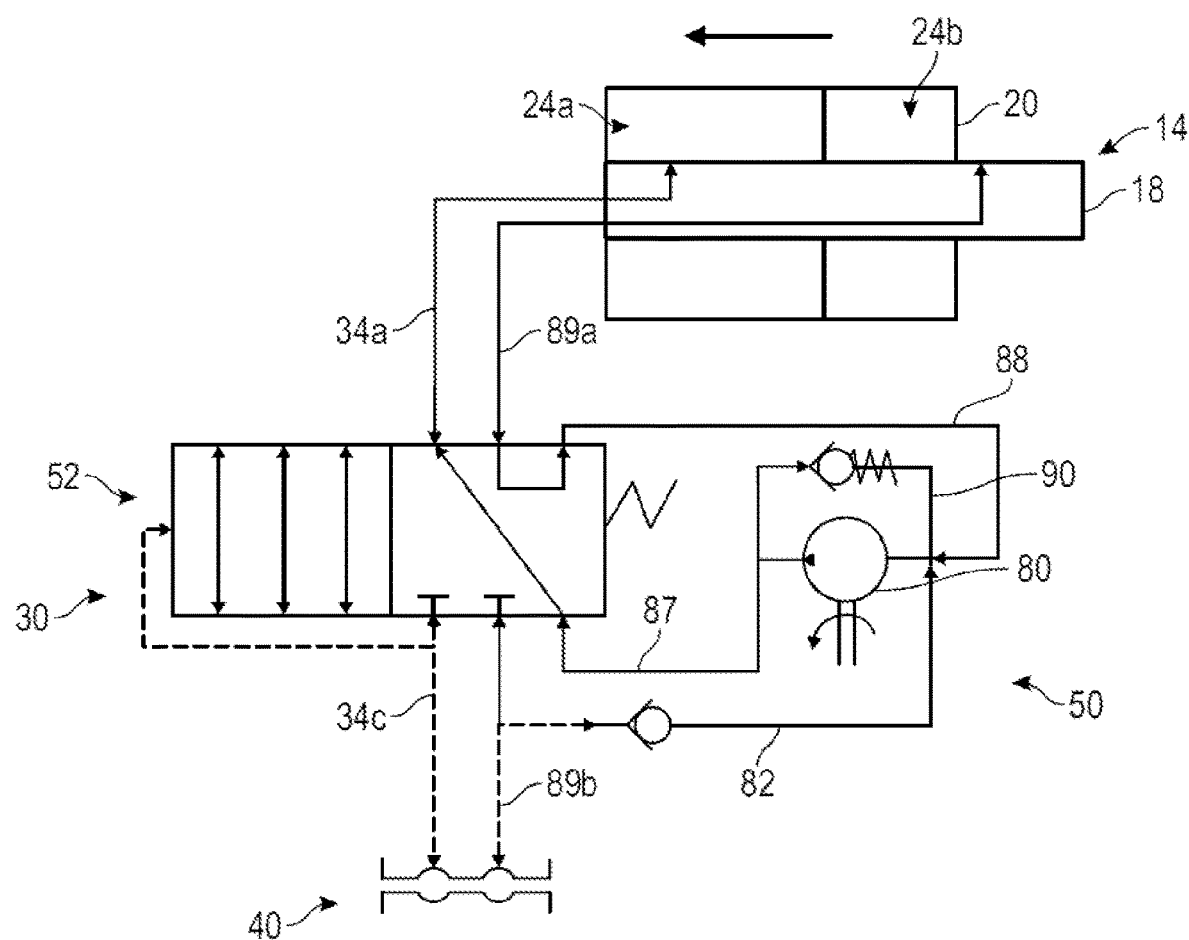

DEVICE FOR SETTING THE PITCH OF BLADES FOR A TURBINE ENGINE, AND TURBINE ENGINE COMPRISING SAME

TECHNICAL FIELD

This invention relates to a device for setting the pitch of blades for a propeller or fan of a turbine engine, in particular for an aircraft, and to a turbine engine comprising same.

PRIOR ART

The technical background comprises the document GB 2 071 781 A.

An aircraft turbine engine can comprise a rotor equipped with variable pitch blades, i.e., blades whose pitch (and more precisely the pitch angle) can be adjusted as a function of flight parameters, so as to optimise the operation of the turbine engine. As a reminder, the pitch angle of a blade corresponds to the angle, in a longitudinal plane perpendicular to the axis of rotation of the blade, between the chord of the blade and the plane of rotation of the fan.

Such a turbine engine comprises a device for controlling the pitch of the blades, or device for setting the pitch of blades. The pitch setting device generally comprises an actuator common to all the blades and a mechanism specific to each of the blades, this mechanism being configured to transform the movement initiated by the actuator into a rotary movement of the corresponding blade. The actuator can be a hydraulic actuator or an electric actuator.

Such a hydraulic actuator is supplied by a supply source of pressurised fluid such as oil in order to provide it with the hydraulic energy required for its operation. According to certain architectures, the fluid supply source is secured to the stationary structure of the turbine engine, in other words placed in a stationary reference frame, while the actuator is secured to the rotor, in other words placed in a rotating reference frame. The pitch control device then comprises a rotating oil transfer bearing or rotating joint (better known by the acronym OTB for "Oil Transfer Bearing") which allows to transfer hydraulic energy from the stationary reference frame towards the rotating reference frame.

To be certified, a turbine engine of this type must also comprise a device for feathering the blades, i.e., a device allowing for positioning the blades in a position in which they are as far as possible from the direction of advance. Generally, in the feathered position, the pitch angle of the blades is 90°. For example, the blades are feathered in the event of a failure (or fault) of the pitch control device of the blades (e.g. a failure of the hydraulic supply chain) so that the latter offer as little resistance (drag) as possible. These failures can occur at any operation phase of the engine. In this situation, it is essential to place the fan in its safety position to avoid potentially catastrophic consequences for the engine or aircraft.

Conventionally, the feathering device comprises, for example, for each blade, a counterweight linked directly or via a gear mechanism to the pivot of the blade. In this example, each counterweight is capable, under the centrifugal effect, of being moved into a reference position in which it imposes a feathered position on the corresponding blade.

However, the counterweights represent a significant mass. On the other hand, the latter also have the disadvantage of being bulky. They form an integral part of the rotor, which is able to move in rotation, so the means for guiding the rotor and the structure of the stator need to be sized accordingly.

Alternatively, the feathering function can be carried out by the addition of an electrically controlled pump arranged in the stationary reference frame. However, such a pump is incompatible with an architecture comprising a rotating oil transfer bearing. In the event of a fault in the rotating oil transfer bearing, the hydraulic actuator is no longer supplied with oil and it is impossible to feather the blades.

The aim of the present invention is therefore to propose a robust blades setting device that is optimised in terms of mass and overall dimensions, allowing to remedy the above-mentioned disadvantages, and in particular allowing reliable, robust and rapid feathering of the blades, even in the event of a fault occurring in the rotating oil transfer bearing.

SUMMARY OF THE INVENTION

To this end, the invention proposes a pitch setting device of blades for a turbine engine for aircraft, comprising:
- a shaft extending along a longitudinal axis X of the turbine engine, blades being mounted on the shaft;
- a connection mechanism connected to the blades of the shaft;
- a control system acting on the connection mechanism and comprising a stationary body secured to the shaft and a movable body in translation along the longitudinal axis X relative to said stationary body and separating the stationary body into two chambers of variable volume, the movable body being connected to the connection mechanism;
- a supply means of the control system configured to supply pressurised fluid to the chambers and to be connected to a main supply source with pressurised fluid arranged in a stationary reference frame of the turbine engine,
- the supply means being configured to be coupled to a fluid transfer bearing configured to transfer pressurised fluid from the main supply source towards each of the chambers of the control system arranged in a rotating reference frame of the turbine engine via the supply means.

According to the invention, the pitch setting device comprises an auxiliary supply circuit with pressurised fluid arranged in the rotating reference frame, connected to the supply means and configured to temporarily receive pressurised fluid from the main supply source and in that the supply means is configured to:
- in normal operation, allow the passage of pressurised fluid from the main supply source towards the chambers of the control system so as to adjust the pitch setting of the blades and to allow the passage of pressurised fluid from the main supply source towards the auxiliary supply circuit, and
- in the event of a break in the supply of pressurised fluid to the chambers from the main supply source, allow the passage of pressurised fluid from the auxiliary supply circuit towards the chambers of the control system so as to cause the blades to feather.

In addition, the supply means comprises a sliding valve arranged in the rotating reference frame and controlled by a hydraulic control 54 and the sliding valve being connected to the fluid transfer bearing, to the auxiliary supply circuit and to at least one of the chambers of the control system, the sliding valve being able to occupy at least two positions:
- in a first position (A), the sliding valve allows the passage of fluid from the main supply source towards the or each chamber connected to the sliding valve so as to adjust the pitch setting of the blades and blocks the passage of fluid from the auxiliary supply circuit towards the or each chamber connected to the sliding valve; and in a second position (B), the sliding valve blocks the passage of fluid from the main fluid supply source towards the or each chamber connected to the sliding valve and allows the passage of fluid from the auxiliary circuit with fluid towards at least one chamber connected to the sliding valve so as to cause the blades to feather.

"Temporarily" means, for the purposes of the invention, that the auxiliary supply circuit is configured to receive pressurised fluid from the main supply source when the main supply source is active and the fluid transfer bearing or rotating joint is operational. So, as soon as the main supply source is generating pressure and there is no fault in the fluid transfer bearing, the auxiliary supply circuit fills up and is ready for use in the event of a break in the supply of pressurised fluid to the chambers from the main supply source.

Advantageously, this type of architecture of the device for controlling the pitch setting of the blades allows the blades of the passive propeller to be feathered in the event of loss of the main pitch actuation function. The invention proposes using only passive elements as close as possible to the actuator to feather the blades in the event of loss of the main hydraulic actuating energy. It is governed solely by the hydraulic pressures of the device.

The invention allows to store the hydraulic energy required to re-feather the blades as close as possible to the actuator in the auxiliary supply circuit and to release it in the event of hydraulic loss of the main actuation function. As the hydraulic energy is stored as close as possible to the actuator, i.e. in the rotating reference frame, the feathering of the blades is ensured even if the rotating fluid transfer bearing breaks.

The pitch setting device according to the invention may comprise one or more of the following characteristic, taken alone or in combination with each other:

in normal operation, the flow rate of pressurised fluid supplying the chambers of the control system is controlled by a control unit arranged in the stationary reference frame and connecting the main supply source to the fluid transfer bearing;

the supply means comprises an auxiliary pipe connecting the two chambers of the control system, the sliding valve being configured to allow the passage of fluid from one chamber to the other when it is in the first position A and to block the passage of fluid from one chamber to the other when it is in the second position B.

In a first embodiment, the auxiliary supply circuit comprises an accumulator arranged in the rotating reference frame and configured to store fluid from the main supply source during normal operation and, in the event of a break in the supply of pressurised fluid to the chambers from the main supply source, the supply means is configured to discharge the fluid stored in the accumulator to one of the chambers of the control system so as to cause the blades to feather.

Such a device allows feathering from a fully passive hydraulic system that remains operational even if the rotating oil transfer is lost.

Indeed, the accumulator allows hydraulic energy to be stored as close as possible to the actuator and released in the event of hydraulic loss of the main function of pitch actuation to feather the blades.

Such an auxiliary supply circuit can be reused several times. If the drop in actuating pressure is only temporary, when high pressure returns, the system immediately resets by again collecting a portion of the flow rate from the main supply source.

Although the accumulators are reputed to be heavy elements, they are much lighter than a conventional counterweight re-feathering system. In addition, an assembly of small hydraulic accumulators judiciously distributed in the rotating reference frame allows to make it easy to integrate.

Preferably, the fluid transfer bearing comprises two transfer ways for transferring pressurised fluid from the main supply source to each of the chambers of the control system and a third transfer way for transferring pressurised fluid from the main supply source towards the accumulator during normal operation.

Advantageously, the supply means comprises a pipe directly connecting one of the chambers to a transfer way of the fluid transfer bearing and another pipe connecting the other of the chambers to another transfer way of the transfer bearing by means of the sliding valve.

Preferably, the auxiliary supply circuit comprises a non-return device, for example a non-return valve, arranged between the accumulator and the fluid transfer bearing.

In a second embodiment, the auxiliary supply circuit comprises a hydraulic pump arranged in the rotating reference frame and configured to be connected to the two chambers in the event of a break in the supply of pressurised fluid to the chambers from the main supply source, and to transmit the fluid from one chamber to the other so as to cause the blades to feather.

Such a device also allows feathering from a fully passive hydraulic system that remains operational even if the rotating oil transfer is lost.

In fact, the pump arranged in the rotating reference frame as close as possible to the actuator allows hydraulic energy to be stored in the auxiliary supply circuit and to be restored in the event of hydraulic loss of the main function of pitch actuation to feather the blades.

In addition, this type of device does not use electrical energy and the hydraulic energy is advantageously generated directly in the rotating reference frame.

In addition, such an auxiliary supply circuit can be reused several times, as the pump is continuously driven in rotation.

In addition, the hydraulic pump can be driven directly by the shaft of the fan or of the propeller in the rotating reference frame.

Moreover, a hydraulic pump is much lighter than a conventional counterweight feathering system.

Preferably, the sliding valve is configured when it is in:

the first position A, to connect each chamber to a transfer way of the fluid transfer bearing and to connect the outlet of the hydraulic pump to the inlet of the hydraulic pump; and the second position B, to connect the outlet of the hydraulic pump to one of the chambers and to connect the other of the chambers to the inlet of the hydraulic pump.

Advantageously, the auxiliary supply circuit comprises a bypass channel connecting one of the transfer ways of the transfer bearing to the inlet of the hydraulic pump and in which a non-return device, for example a non-return valve, is mounted.

In addition, the auxiliary supply circuit may comprise another bypass channel directly connecting the inlet of the hydraulic pump to the outlet of the hydraulic pump, in which is mounted a non-return device comprising a spring-actuated member for opening and closing the fluid passage in the bypass conduit. A non-return device of this type is advantageous for protecting the pump from any excess pressure.

In addition, one of the chambers may have a smaller volume than the other during normal operation. In this case, the auxiliary supply circuit may comprise a hydraulic accumulator connected to the hydraulic pump, the hydraulic accumulator having a volume substantially equal to the difference in volumes between the two chambers.

Another object of the invention concerns a turbine engine, in particular for an aircraft, comprising a propeller or a fan comprising variable pitch blades and a device for setting the pitch of the blades according to the invention.

Preferably, the turbine engine is a variable fan turbojet engine or a variable propeller turboprop engine.

BRIEF DESCRIPTION OF FIGURES

The present invention will be better understood and other details, characteristics and advantages of the present invention will become clearer from the following description of non-limiting examples, with reference to the appended drawings in which:

FIG. 1 is a schematic axial (or longitudinal) half-section view of an aircraft turbine engine to which the invention applies;

FIG. 2 is a schematic view of a circuit for controlling and supplying pressurised fluid to the chambers of a hydraulic actuator according to a first embodiment of the invention in normal operation, FIG. 3 shows a schematic view under pressure of the chambers of the hydraulic actuator according to the first embodiment of the invention in the event of the main power supply being cut off, FIG. 4 is a schematic view of an improvement to the control and fluid supply circuit of FIG. 2, FIG. 5 is a schematic view of a circuit for controlling and supplying pressurised fluid to the chambers of a hydraulic actuator according to a second embodiment of the invention in normal operation, and FIG. 6 shows a schematic view under pressure of the chambers of the hydraulic actuator according to the second embodiment of the invention in the event of the main power supply being cut off.

The elements having the same functions in the different embodiments have the same references in the figures.

DESCRIPTION OF THE EMBODIMENTS

The invention applies to any turbine engine equipped with at least one shrouded or non-shrouded fan, the propeller blades of which (in the case of an non-shrouded fan) or the fan vanes of which (in the case of a shrouded fan) are equipped with a pitch setting device.

In particular, the invention applies to a variable fan turbojet engine or a variable propeller turboprop engine.

In the remainder of the description, the terms propeller and propeller blades will be used irrespective of whether the invention applies to a turbine engine with an non-shrouded fan or to a turbine engine with a shrouded fan (in which the propeller corresponds to the fan and the propeller blades to the fan vanes).

FIG. 1 shows partially an aircraft turbine engine 1 to which the invention applies. The turbine engine has a longitudinal axis X comprising a propeller 2 rotating about a shaft extending along the longitudinal axis X. The propeller 2 comprises a rotor 3 that is movable (about the axis X) relative to a stationary structure 4. The rotor 3 carries a series of variable pitch blades 5. In particular, the rotor 3 comprises a support annulus 6 for supporting the blades 5. Each blade 5 comprises a root 7 mounted in a housing in the annulus 6 so that the blade 5 is movable in rotation about an axis Y substantially perpendicular to the axis X.

In the example shown, the propeller 2 is placed upstream of a gas generator comprising, for example, a low-pressure compressor, a high-pressure compressor, a combustion chamber, a high-pressure turbine and a low-pressure turbine. Of course, the invention also applies to turbine engines with a non-shrouded fan referred to as open rotor in which a propeller is placed downstream of a gas generator.

By convention in this application, the terms "upstream" and "downstream" are defined in relation to the circulation orientation of the gases in the turbine engine 1. Also, by convention in the present application, the terms "internal", "external", "inside" and "outside" are defined radially with respect to the longitudinal axis X of the turbine engine 1, which is in particular the axis of rotation of the rotors of the compressors and turbines.

The rotor 3 is guided in rotation relative to the stationary structure 4 of the turbine engine 1 defining a rotating reference frame. In this way, any element secured to the rotor 3 is said to be located in the rotating reference frame. On the other hand, any element secured to the stationary structure of the turbine engine is placed in a stationary reference frame.

The turbine engine 1 comprises a pitch setting device 10 for at least one blade 5.

The pitch setting device 10 comprises a connection mechanism 12 connected to the blades of the propeller and a control system 14 acting on the connection mechanism 12. The control system 14 is secured in rotation to the shaft carrying the blades, i.e. it is located in the rotating reference frame. Advantageously, but not restrictively, the control means 14 comprises a linear annular actuator 16 with an axis coaxial with the longitudinal axis X. The connection mechanism 12 allows to transform the movement initiated by the actuator into a rotational movement of the blades 5.

The actuator 16 is a hydraulic actuator. In this case, the energy to be transported to the actuator is hydraulic energy, in other words a pressurised liquid such as oil.

In the embodiments illustrated in FIGS. 2 to 5, the actuator 16 comprises a stationary body 18 secured in rotation to the shaft 3 and a body 20 movable in translation relative to the stationary body 18 along the longitudinal axis X.

In other words, in the present application, the stationary body 18 of the actuator refers to the body 16 of the actuator connected to the shaft 3 of the propeller, or fan shaft, while the movable body 20 of the actuator refers to the body 16 of the actuator connected to the blades 5 of the propeller, also referred to as fan vanes.

The stationary body 18 is cylindrical, with a longitudinal axis X and a circular cross-section. It comprises an annular wall 21 attached to the shaft 3 of the propeller. The mass of the pitch setting device is thus better distributed, improving the dynamic behaviour of the rotor of the propeller or of the fan. The movable body 20 is connected to the connection mechanism 12 so that the movement of the movable body 20 along the longitudinal axis acts on the connection mechanism 12, causing the blades 5 to pivot about the pitch axis Y and thus the pitch setting of the blades 5.

The connection mechanism 12 comprises, for example, for each blade, a crank having a first end centred on the axis Y and coupled in rotation with the corresponding blade and a second end eccentric with respect to the axis Y and secured to the movable element of the actuator 16. The crank allows to reduce the force required to adjust the blade setting.

The blades 5 and the shaft 3 of the propeller can thus be rotated relative to the casing 4 of the turbine engine 1 by the translational movement of the movable body 20 of the actuator 16 relative to the casing 4 of the turbine engine 1 via the connection mechanism 12.

The stationary body 18 also comprises a radial wall 22 delimiting two variable-volume chambers 24a, 24b in the movable body 20, which are axially opposite each other. The radial wall 22 extends outwards from a radially external face of the annular wall 21. The movable body 20 is arranged around the stationary body 18 and is coaxial with the longitudinal axis X. It moves axially under the action of a control from the pitch setting device 10. To achieve this, the pitch setting device 10 comprises a fluid supply means 30 for controlling it.

The first chamber 24a and the second chamber 24b are each intended to receive a fluid, for example a pressurised hydraulic fluid, from a main pressurised fluid supply source 32 arranged in the stationary reference frame of the turbine engine 1. In other words, the turbine engine 1 comprises the main supply source 32 which is arranged in a stationary nacelle of the aircraft turbine engine.

Preferably, but not exclusively, the actuator is an annular hydraulic cylinder. The cylinder consists of a stationary rod secured to the fan shaft and of a cylinder that can move in relation to the rod. The rod is formed by the stationary body 18, while the cylinder is formed by the movable body 20.

With reference to FIGS. 2 to 6, the fluid supply means 30 of the pitch setting device is configured so as to be connected to the main fluid supply source 32 and to supply the chambers 24a, 24b of the actuator of the control system 14. To this end, the fluid supply means 30 comprises several pipes 34 for supplying the control system 14. Advantageously, these pipes 34 are high-pressure pipes. The pressure circulating in each pipe is around 120 bar. The high-pressure fluid circulating in the pipes 34 is advantageously an oil.

The fluid supply means 30 is configured to be coupled to a fluid transfer bearing of the turbine engine via pipes 34. The fluid transfer bearing 40 is configured to transfer pressurised fluid (oil) from the main supply source 32 (in the stationary reference frame) towards each of the chambers 24a, 24b of the control system arranged in the rotating reference frame of the turbine engine via the supply means 30. The oil transfer bearing 40 of the turbine engine is coupled to the main supply source 32 via other pipes 36.

In other words, in order to optimise space, the pitch setting device 10 of the present invention is mounted in the rotating reference frame of the aircraft turbine engine, while the main power source 32 is mounted in the stationary reference frame. The fluid transfer bearing transfers fluid between the elements of the stationary reference frame, in particular the main supply source 32, and the elements of the rotating reference frame, in particular the supply means 30 of the pitch setting device 10.

This device for transferring fluid 40, preferably oil, is a rotating union or rotating joint. It comprises a stationary member 42 secured to the stationary structure 4 and a movable member 44 secured to the rotor 3. This fluid transfer device 40 transmits hydraulic energy from the stationary member 42 towards the movable member 44 in a sealed manner. It may comprise one or more ways. Thus, at least one pipe 34 of the supply means 30 connects the movable member 44 of the transfer bearing 40 and the actuator 16 and at least one other pipe 36 connects the stationary member 42 of the transfer bearing 40 to the main supply source 32 of the aircraft turbine engine.

According to the embodiments illustrated in FIGS. 1 to 6, the pitch setting device 10 of the blades also comprises an auxiliary pressurised fluid supply circuit 50 arranged in the rotating reference frame and connected on the one hand to the supply means 30 and on the other hand to the main supply source 32 by means of the transfer bearing 40 by pipes. The auxiliary supply circuit 50 is configured to temporarily receive pressurised fluid from the main supply source 32, i.e. when the latter is active and the fluid transfer bearing 40 is operational.

So, as soon as the main supply source generates pressure, the auxiliary supply circuit fills up and is ready to be used in the event of a break in the supply of pressurised fluid to the chambers from the main supply source.

In normal operation, the supply means 30 allows pressurised fluid to pass from the main supply source 32 towards the chambers 24a, 24b of the control system 14 so as to adjust the pitch setting of the blades 5. In addition, the supply means 30 allows pressurised fluid to pass from the main supply source 32 towards the auxiliary supply circuit 50 via the transfer bearing 40.

In the event of a break in the supply of pressurised fluid to the chambers 24a, 24b from the main supply source 32, the supply means 30 is configured to allow pressurised fluid to pass from the auxiliary supply circuit 50 towards the chambers 24a, 24b of the control system so as to cause the blades to feather. In this position, the second chamber 24b has a much smaller volume than the first chamber 24a. Such a break in the supply of pressurised fluid to the chambers 24a, 24b from the main supply source 32 may be due either to a problem with the main supply source 32 itself or to a failure of the rotating transfer bearing 40.

During normal operation, hydraulic energy is stored in the auxiliary supply circuit 50. This is discharged to at least the first chamber 24a of the actuator in the event of hydraulic loss of the main actuation function, i.e. in the event of a break in the supply of pressurised fluid to the chambers 24a, 24b by the main supply source 32. As the hydraulic energy is stored as close as possible to the actuator, i.e. in the rotating reference frame, the feathering of the blades is ensured even if the rotating fluid transfer bearing breaks. The auxiliary supply circuit 50 is self-sufficient (or independent) in hydraulic energy in the event of a break in the supply to the chambers 24a, 24b from the main supply source 32. In other words, during this phase, the auxiliary supply circuit 50 does not receive any hydraulic energy from the stationary reference frame.

To this end, the supply means 30 advantageously comprises a sliding valve 52 arranged in the rotating reference frame and controlled by a hydraulic control 54 and a return means 55, such as a spring. The sliding valve 52 is connected by means of pipes to the fluid transfer bearing 40, to the auxiliary supply circuit 50 and to at least one of the chambers 24 of the control system 14.

The sliding valve 52 can occupy at least two positions: a first position A and a second position B.

In the first position A, the sliding valve 52 allows fluid to pass from the main supply source 32 towards the or each chamber 24 connected to the sliding valve 52 so as to adjust the pitch setting of the blades 5. In this position, the sliding valve 52 also blocks the passage of fluid from the auxiliary supply circuit 50 towards the or each chamber connected to the sliding valve 52.

In the second position B, the sliding valve 52 blocks the passage of fluid from the main fluid supply source 32 towards the or each chamber connected to the sliding valve 52 and allows the passage of fluid from the auxiliary fluid circuit 50 towards at least one chamber connected to the sliding valve 52 so as to cause the blades of the propeller to feather.

The sliding valve 52 is held in its first position A by the hydraulic control 54 by means of pressurised fluid from the main supply source 32 by means of one of the ways of the transfer bearing 40 connected to the first chamber 24a of the control system. The return means 55, such as a spring, is configured to urge the sliding valve 52 into the second position B. As long as the fluid pressure in the pipe 34c connecting the way of the fluid transfer bearing 40 to the first chamber 24a is greater than the return force of the spring the sliding valve 52 is in its first position A and at least the first chamber 24a of the actuator is supplied by the main supply source 32 by means of a transfer way of the oil transfer bearing.

Advantageously, the pitch setting device 10 comprises a control unit 56 arranged in the stationary reference frame and connecting the main supply source 32 to two ways of the rotating fluid transfer bearing 40, each connected to one of the chambers 24a, 24b of the control system 14. The control unit 56 allows to regulate the flow rate of the pressurised fluid to each chamber so as to adjust the pitch setting of the blades 5 during normal operation.

According to a first embodiment illustrated in FIGS. 2 and 3, which represents in greater detail the circuit for controlling and supplying pressurised fluid to the chambers 24a, 24b of the hydraulic actuator, the auxiliary supply circuit 50 comprises an accumulator 60 arranged in the rotating reference frame and connected by a pipe 61 to the sliding valve 52 and by another pipe 62 to a third way of the movable member 44 of the transfer bearing 40. Another pipe 36c connects the third way of the stationary member 42 of the transfer bearing to the main supply source 32.

This third way of the fluid transfer bearing 40 allows pressurised fluid to be transferred from the main supply source 32 towards the accumulator 60 during normal operation.

So, as soon as the main supply source generates pressure, the accumulator fills up and is ready for use in the event of a break in the supply of pressurised fluid to the chambers from the main supply source.

Advantageously, a non-return device 64, for example a non-return valve, is mounted on the pipe 62 connecting the accumulator 60 and the fluid transfer bearing 40. Advantageously, this non-return device 64 allows that the fluid contained in the accumulator is not emptied into the rotating oil transfer or the main supply system when one of these two systems fails.

According to the first embodiment illustrated in FIGS. 2 and 3, a pipe 34b of the supply means 30 directly connects the second chamber 24b to one of the transfer ways of the fluid transfer bearing 40 controlled by the control unit 56. Another pipe 34a of the supply means 30 connects the first chamber 24a, by means of the sliding valve 52, to another transfer way of the transfer bearing 40, also controlled by the control unit 56.

In normal operation, the accumulator 60 is filled by the main supply source 32 and stores hydraulic energy.

If the supply of pressurised fluid to the chambers 24a, 24b is interrupted by the main supply source 32, as shown in FIG. 3, the sliding valve 52 switches from the first position A to the second position B in which the accumulator 60 of the auxiliary supply circuit 50 is connected to the first chamber 24a. The hydraulic energy stored in the accumulator is discharged into the first chamber 24a, while the second chamber 24b is no longer supplied with fluid, causing the blades of the propeller to feather.

The accumulator is, for example, a pressurised liquid reservoir, such as oil.

Advantageously, this embodiment allows passive energy to be restored in the event of a loss of actuating oil pressure. Moreover, this architecture can be reused several times without any particular assistance. If the drop in actuating pressure is only temporary, when high pressure returns, the sliding valve returns to its first position A and the accumulator 60 can be recharged with fluid from the main supply source 32 by collecting some of the flow rate from the pump of the pitch setting system.

In addition, in order to facilitate its integration, the auxiliary supply circuit 50 may comprise an assembly of hydraulic accumulators judiciously distributed in the rotating reference frame.

FIG. 4 illustrates an architecture similar to FIG. 2. According to this circuit for controlling and supplying pressurised fluid to the chambers 24a, 24b of the actuator, the supply means 30 also comprises an auxiliary pipe 70 connecting the two chambers 24a, 24b together by means of the sliding valve 52.

The sliding valve 52 is then configured to allow the passage of fluid from the second chamber 24b to the first chamber 24a when it is in the first position A and to block the passage of fluid between the two chambers when it is in the second position B.

This auxiliary pipe 70 allows a heated fluid or a cooled fluid to circulate from one chamber to another. The auxiliary pipe 70 allows to provide a hydraulic connection between the chambers 24a and 24b of the hydraulic cylinder.

Thus, under the effect of a pressure difference between the two chambers 24a, 24b, a flow of oil is established in the auxiliary pipe 70. Consequently, in a case where the position of the cylinder is stabilised at a stationary point, this auxiliary pipe 70 advantageously allows to guarantee a small circulation of fluid despite the fact that there is no actuating flow rate. This small flow rate can be used to cool or heat the oil of the cylinder.

According to a second embodiment illustrated in FIGS. 5 and 6, which show in greater detail the circuit for controlling and supplying pressurised fluid to the chambers 24a, 24b of the hydraulic actuator, the auxiliary supply circuit 50 comprises a hydraulic pump 80 arranged in the rotating reference frame.

The auxiliary supply circuit 50 comprises a bypass channel 82 connecting one of the transfer ways of the transfer bearing to the inlet of the hydraulic pump 80 and in which a non-return device 84, for example a non-return valve, is mounted. In the example shown, the bypass channel 82 is connected to the way connecting the second chamber 24b to the main supply source 32 during normal operation.

The outlet and the inlet of the hydraulic pump 80 are also connected to the sliding valve 52 respectively by a first conduit 87 and a second conduit 88 of the auxiliary supply circuit 50.

In addition, the first chamber 24a and the second chamber 24b are connected to the main supply source 32 by means of two ways of the transfer bearing 40 via the sliding valve 52 during normal operation. In the embodiment illustrated in FIGS. 5 and 6, the first chamber 24a is connected to the sliding valve 52 by a pipe 34a and the sliding valve 52 is connected by another pipe 34c to a first way of the transfer bearing 40 (as in the first embodiment). In addition, in this second embodiment, the second chamber 24b is also connected to the transfer bearing 40, more specifically to a second transfer way, by means of the sliding valve 52, with a pipe 89a connecting the second chamber 24b to the sliding valve 52 and another pipe 89b connecting the sliding valve 52 to the transfer bearing 40.

According to this second embodiment, the sliding valve 52 is configured, when it is in its first position A, to connect each chamber 24a, 24b to a transfer way of the fluid transfer bearing and to connect the outlet of the hydraulic pump 80 to its inlet.

Thus, during normal operation, some of the fluid intended for the second chamber 24b is temporarily collected until the auxiliary supply circuit 50 is filled, in particular the pipe 82, the first conduit 87 and the second conduit 88. The hydraulic pump ensures the circulation of the fluid from the first conduit 87 to the second conduit 88 by means of the sliding valve 52.

When the auxiliary supply circuit 50 is full of oil, the auxiliary supply circuit no longer requires collecting and the fluid circulates in a loop between the first and the second conduit 87, 88. The recirculated fluid does not generate any major overheating because when the re-feathering system is not in use, the pressure loss in the circuit is very low. In addition, the hydraulic pump is arranged in a relatively cold area of the turbine engine, the fan compartment.

In the event of a break in the supply of pressurised fluid to the chambers from the main supply source 32, the sliding valve 52 switches from its first position A to its second position B, in which it connects the outlet of the hydraulic pump 80 to the first chamber 24a and the inlet of the hydraulic pump 80 to the second chamber 24b respectively and thus allows the hydraulic pump 80 to transmit fluid from the second chamber 24b to the first chamber 24a so as to cause the blades of the propeller to feather. The second chamber 24b is emptied in favour of the first chamber 24a, causing the blades to feather.

The auxiliary supply circuit 50 allows to store hydraulic actuating energy during normal operation, which is returned to the chambers of the actuator in the event of a loss of actuating oil pressure in order to ensure that the blades are feathered.

Advantageously, this architecture does not require any additional way to be added to the rotating transfer bearing, and the hydraulic pump can be driven directly by the shaft carrying the blades in the rotating reference frame, thus allowing to save weight and space.

This second architecture can also be reused several times, as the hydraulic pump is continuously driven in rotation.

If one of the chambers has a reduced volume with respect to the other during normal operation, in this case the auxiliary supply circuit 50 also comprises a hydraulic accumulator (not illustrated) connected to the hydraulic pump and having a volume substantially equal to the difference in volume between the two chambers in order to store the additional fluid required to feather the blades.

Advantageously, the auxiliary supply circuit 50 comprises another bypass channel 90 directly connecting the inlet of the hydraulic pump 80 to the outlet of the hydraulic pump, in which is mounted a non-return device 91 comprising a member for opening and closing the fluid passage in the other bypass channel 88 actuated by a spring 92, the assembly forming a pressure relief valve to ensure that the pressure in the hydraulic pump remains below a predetermined threshold and allowing the pressure to be monitored during operation.

The invention claimed is:

1. A pitch setting device of blades for a turbine engine for aircraft, comprising:
   a shaft extending along a longitudinal axis (X) of the turbine engine, blades being mounted on the shaft,
   a connection mechanism connected to the blades of the shaft;
   a control system acting on the connection mechanism and comprising a stationary body secured to the shaft and a movable body in translation along the longitudinal axis (X) with respect to said stationary body and separating the stationary body into two chambers of variable volume, the movable body being connected to the connection mechanism;
   a supply means of the control system configured to supply the chambers with pressurised fluid and to be connected to a main supply source of the turbine engine with pressurised fluid arranged in a stationary reference frame of the turbine engine,
   the supply means being configured to be coupled to a fluid transfer bearing configured to transfer the pressurised fluid from the main supply source towards each of the chambers of the control system arranged in a rotating reference frame of the turbine engine via the supply means;
   the pitch setting device being wherein it comprises an auxiliary supply circuit with pressurised fluid arranged in the rotating reference frame, connected to the supply means and configured to receive pressurised fluid from the main supply source and in that the supply means is configured to:
   in normal operation, allows the passage of pressurised fluid from the main supply source towards the chambers of the control system so as to adjust the pitch setting of the blades and to allow the passage of pressurised fluid from the main supply source towards the auxiliary supply circuit, and
   in the event of a break in the supply of pressurised fluid to the chambers from the main supply source, allows the passage of pressurised fluid from the auxiliary supply circuit towards the chambers of the control system so as to cause the blades to feather, and
   wherein the supply means comprises a sliding valve arranged in the rotating reference frame and controlled by a hydraulic control and the sliding valve being connected to the fluid transfer bearing, to the auxiliary supply circuit and to at least one of the chambers of the control system, the sliding valve being able to occupy at least two positions:
   in a first position (A), the sliding valve allows the passage of the fluid from the main supply source towards the or each chamber connected to the sliding valve so as to adjust the setting of the pitch of the blades and blocks the passage of the fluid from the auxiliary supply circuit towards the or each chamber connected to the sliding valve; and
   in a second position (B), the sliding valve blocks the passage of the fluid from the main supply source with fluid towards the or each chamber connected to the sliding valve and allows the passage of the fluid from the auxiliary supply circuit towards at least one chamber connected to the sliding valve so as to cause the blades to feather.

2. The pitch setting device of claim 1, wherein, in normal operation, the flow rate of pressurised fluid supplying the chambers of the control system is controlled by a control unit arranged in the stationary reference frame and connecting the main supply source to the fluid transfer bearing.

3. The pitch setting device according to claim 1, wherein the auxiliary supply circuit comprises an accumulator arranged in the rotating reference frame and configured to store the fluid from the main supply source during normal operation and, in the event of a break in the supply of pressurised fluid to the chambers from the main supply source, the supply means is configured to discharge the fluid stored in the accumulator towards one of the chambers of the control system so as to cause the blades to feather.

4. The pitch setting device of claim 3, wherein the fluid transfer bearing comprises two transfer ways for transferring pressurised fluid from the main supply source towards each of the chambers of the control system and a third transfer way for temporarily transferring pressurised fluid from the main supply source towards the accumulator in normal operation.

5. The pitch setting device as claimed in claim 3, wherein the supply means comprises a pipe directly connecting one of the chambers to a transfer way of the fluid transfer bearing and another pipe connecting the other of the chambers to another transfer way of the transfer bearing by means of the sliding valve.

6. The pitch setting device according to claim 3, wherein the auxiliary supply circuit comprises a non-return device, for example a non-return valve, arranged between the accumulator and the fluid transfer bearing.

7. The pitch setting device according to claim 1, wherein the auxiliary supply circuit comprises a hydraulic pump arranged in the rotating reference frame and configured to be connected to the two chambers in the event of a break in the supply of pressurised fluid to the chambers by the main supply source, and to transmit the fluid from one chamber to the other so as to cause the blades to feather.

8. The pitch setting device of claim 7, wherein a first of the chambers has a reduced volume relative to the other in normal operation and wherein the auxiliary supply circuit comprises a hydraulic accumulator connected to the hydraulic pump, the hydraulic accumulator having a volume substantially equal to the difference in volumes between the two chambers.

9. The pitch setting device according to claim 7, wherein the sliding valve is configured when in:
the first position (A), to connect each chamber to a transfer way of the fluid transfer bearing and to connect the outlet of the hydraulic pump to the inlet of the hydraulic pump; and
the second position (B), to connect the outlet of the hydraulic pump to one of the chambers and to connect the other of the chambers to the inlet of the hydraulic pump.

10. The pitch setting device according to claim 9, wherein the auxiliary supply circuit comprises a bypass channel connecting one of the transfer ways of the transfer bearing to the inlet of the hydraulic pump and in which a non-return device, for example a non-return valve, is mounted.

11. The pitch setting device according to claim 9, wherein the auxiliary supply circuit comprises a bypass channel directly connecting the inlet of the hydraulic pump to the outlet of the hydraulic pump, in which is mounted a non-return device comprising a member for opening and closing the fluid passage in the bypass conduit, actuated by a spring.

12. The pitch setting device according to claim 1, wherein the supply means comprises an auxiliary pipe connecting the two chambers of the control system, the sliding valve being configured to allow the passage of the fluid from one chamber to the other when it is in the first position (A) and to block the passage of the fluid from one chamber to the other when it is in the second position (B).

13. A turbine engine for aircraft comprising a propeller or a fan comprising variable pitch blades and a pitch setting device of the blades according to claim 1, the turbine engine preferably being a variable fan turbojet engine or a variable propeller turboprop engine.

* * * * *